US012593040B2

(12) United States Patent
Lin et al.

(10) Patent No.: US 12,593,040 B2
(45) Date of Patent: Mar. 31, 2026

(54) METHOD AND APPARATUS FOR IMPROVING PERFORMANCE OF NEURAL NETWORK FILTER BASED VIDEO CODING

(71) Applicant: MEDIATEK INC., Hsin-Chu (TW)

(72) Inventors: Wen-Chun Lin, Hsinchu City (TW);
Ching-Yeh Chen, Hsinchu City (TW);
Tzu-Der Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/842,797

(22) PCT Filed: Feb. 4, 2024

(86) PCT No.: PCT/CN2024/075666
§ 371 (c)(1),
(2) Date: Aug. 29, 2024

(87) PCT Pub. No.: WO2024/164963
PCT Pub. Date: Aug. 15, 2024

(65) Prior Publication Data
US 2025/0203069 A1      Jun. 19, 2025

Related U.S. Application Data

(60) Provisional application No. 63/483,773, filed on Feb. 8, 2023, provisional application No. 63/483,771, filed on Feb. 8, 2023.

(51) Int. Cl.
*H04N 19/117*          (2014.01)
*G06T 9/00*          (2006.01)
(Continued)

(52) U.S. Cl.
CPC ............ *H04N 19/117* (2014.11); *G06T 9/002* (2013.01); *H04N 19/157* (2014.11); *H04N 19/176* (2014.11); *H04N 19/70* (2014.11)

(58) Field of Classification Search
CPC .......... G06N 3/02; G06N 3/045; G06T 9/002; H04N 19/117; H04N 19/157; H04N 19/176; H04N 19/186; H04N 19/70; H04N 19/82
See application file for complete search history.

(56) References Cited

U.S. PATENT DOCUMENTS

| | | | |
|---|---|---|---|
| 2019/0273948 A1* | 9/2019 | Yin ......................... | G06N 3/045 |
| 2022/0109860 A1* | 4/2022 | Chen ......................... | G06N 3/04 |

(Continued)

FOREIGN PATENT DOCUMENTS

| | | | |
|---|---|---|---|
| CN | 4604523 | * | 10/2022 |
| WO | 2021/244884 A1 | | 12/2021 |
| WO | 2022/052533 A1 | | 3/2022 |

OTHER PUBLICATIONS

Yue Li et al. "EE1-1.7: Combined Test of EE1-1.6 and EE1-1.3 (JVET-Z0113-v1)" joint Video Experts Team (JVET)of ITU-T SG 16 WP 3 and ISO/IEC JTC 1/SC 29 ,Apr. 14, 2022.

(Continued)

*Primary Examiner* — Md N Haque
(74) *Attorney, Agent, or Firm* — Winston Hsu

(57)          ABSTRACT
A video decoding method includes: receiving an encoded video bitstream, and decoding a first block. The encoded video bitstream includes data to be decoded as the first block of pixels in a picture, and the first block includes a luma block and at least one chroma block. Decoding the first block includes: determining whether to apply a neural network (NN) filter on the luma block and the at least one chroma block according to an NN filter mode of the luma block and at least one NN filter mode of the at least one chroma block.

19 Claims, 6 Drawing Sheets

(51) Int. Cl.
    *H04N 19/157*     (2014.01)
    *H04N 19/176*     (2014.01)
    *H04N 19/70*     (2014.01)

(56)         References Cited

U.S. PATENT DOCUMENTS

| | | | |
|---|---|---|---|
| 2022/0295116 A1* | 9/2022 | Ma | H04N 19/117 |
| 2023/0319314 A1* | 10/2023 | Ma | G06N 3/045 |
| | | | 375/240.12 |
| 2024/0089510 A1* | 3/2024 | Deshpande | H04N 19/70 |
| 2024/0275960 A1* | 8/2024 | Poirier | H04N 19/117 |

OTHER PUBLICATIONS

"International Search Report" mailed on May 7, 2024 for International application No. PCT/CN2024/075666, International filing date:Feb. 4, 2024.

* cited by examiner (C)

(B)

(A)

METHOD AND APPARATUS FOR IMPROVING PERFORMANCE OF NEURAL NETWORK FILTER BASED VIDEO CODING

BACKGROUND OF THE INVENTION

1. Field of the Invention

The present invention relates to video coding, and more particularly, to a method and apparatus for improving performance of neural network filter based video coding.

2. Description of the Prior Art

The conventional video coding standards generally adopt a block based coding technique to exploit spatial and temporal redundancy. For example, the basic approach is to divide the whole source picture into a plurality of blocks, perform intra/inter prediction on each block, transform residual of each block, and perform quantization and entropy encoding. Besides, a reconstructed picture is generated in a coding loop to provide reference data used for coding following blocks. For certain video coding standards, in-loop filter(s) may be used for enhancing the image quality of the reconstructed picture. The video decoder is used to perform an inverse operation of a video encoding operation performed by a video encoder. For example, the video decoder may have a plurality of processing circuits, such as an entropy decoding circuit, an intra prediction circuit, a motion compensation circuit, an inverse quantization circuit, an inverse transform circuit, a reconstruction circuit, and in-loop filter(s).

With the development of the video coding standard, more coding tools are introduced to improve the video quality and the coding efficiency. For example, a neural network (NN) coding tool may be adopted to remove artifacts or improve coding performance. However, since the input sequences are various, the modifications generated by an NN filter may not be always better. Thus, there is a need for an innovative design that is capable of improving performance of NN filter based video coding.

SUMMARY OF THE INVENTION

One of the objectives of the claimed invention is to provide a method and apparatus for improving performance of neural network filter based video coding.

According to a first aspect of the present invention, an exemplary video decoding method is disclosed. The exemplary video decoding method includes: receiving an encoded video bitstream and decoding a first block. The encoded video bitstream includes data to be decoded as the first block of pixels in a picture, and the first block includes a luma block and at least one chroma block. Decoding the first block includes: determining whether to apply a neural network (NN) filter on the luma block and the at least one chroma block according to an NN filter mode of the luma block and at least one NN filter mode of the at least one chroma block.

According to a second aspect of the present invention, an exemplary video encoding method is disclosed. The exemplary video encoding method includes: receiving video data and encoding a first block. The video data includes data to be encoded as the first block of pixels in a picture, and the first block includes a luma block and at least one chroma block. Encoding the first block includes: selecting a neural network (NN) filter mode of the luma block and at least one NN filter mode of the at least one chroma block, to indicate whether an NN filter is applied on the luma block and the at least one chroma block.

According to a third aspect of the present invention, an exemplary video decoder is disclosed. The exemplary video decoder includes a video data memory and a decoding circuit. The video data memory is configured to receive an encoded video stream, wherein the encoded video bitstream includes data to be decoded as a block of pixels in a picture, wherein the block includes a luma block and at least one chroma block. The decoding circuit is configured to perform decoding of the block. The decoding circuit includes a neural network (NN) filter and a control circuit. The control circuit is configured to determine whether to apply the NN filter on the luma block and the at least one chroma block according to an NN filter mode of the luma block and at least one NN filter mode of the at least one chroma block.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
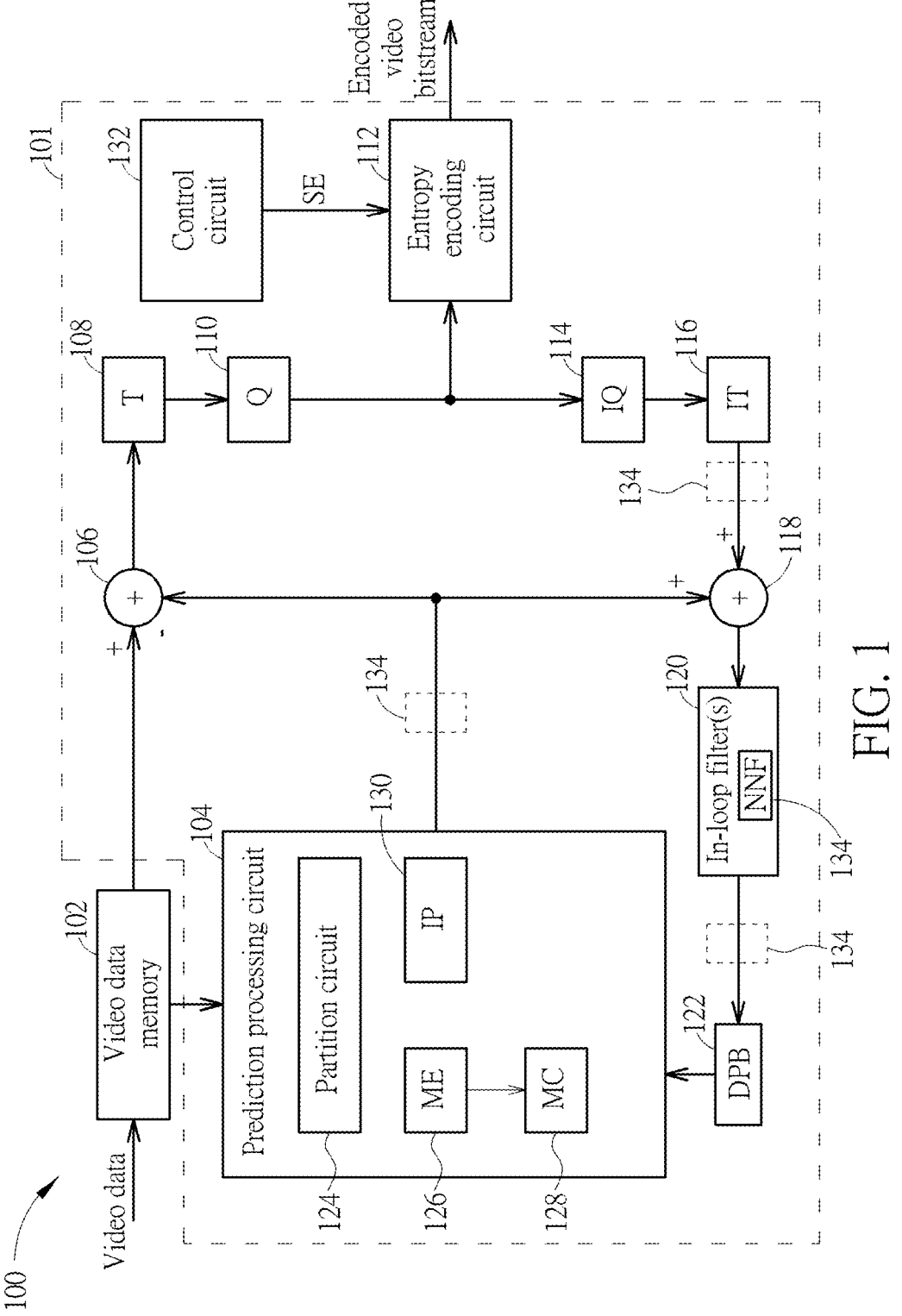
FIG. 1 is a block diagram illustrating a video encoder that supports the proposed neural network filter enhancement design according to an embodiment of the present invention.

FIG. 1 is a block diagram illustrating a video encoder that supports the proposed neural network (NN) filter enhancement design according to an embodiment of the present invention. By way of example, but not limitation, the video encoder 100 may be a versatile video coding (VVC) encoder. The video encoder 100 may perform intra and inter predictive coding of video blocks within video frames or pictures. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 1, the video encoder 100 includes an encoding circuit 101 and a video data memory 102. The video data memory 102 is configured to receive video data to be encoded. For example, the video data includes data to be encoded as different blocks of pixels in the same picture, and each block may include a luma block and at least one chroma block (e.g., two chroma blocks). In some embodiments of the present invention, each block may be a coding tree unit (CTU) including one luma coding tree block (CTB) and two chroma CTBs. The encoding circuit 101 is configured to perform encoding of the video data (e.g., data of different blocks in the same picture) buffered in the video data memory 102. The encoding circuit 101 may include a prediction processing circuit 104, a residual generation circuit 106, a transform circuit (labeled by "T") 108, a quantization circuit (labeled by "Q") 110, an entropy encoding circuit (e.g., a variable-length code (VLC) encoder) 112, an inverse transform circuit (labeled by "IQ") 114, an inverse transform circuit (labeled by "IT") 116, a reconstruction circuit 118, one or more in-loop filters 120, a decoded picture buffer (DPB) 122, a control circuit 132, and one or more NN filters (labeled by "NNF") 134. The prediction processing circuit 104 may include a partition circuit 124, a motion estimation circuit (labeled by "ME") 126, a motion compensation circuit (labeled by "MC") 128, and an intra prediction circuit (labeled by "IP") 130. It should be noted that the prediction processing circuit 104 may support additional coding tools, depending upon actual design considerations. The control circuit 132 is configured to manage an encoding procedure of each block in a picture. The control circuit 132 may generate and output syntax elements SE to the entropy encoding circuit 112, such that the syntax elements SE (which may carry control information of circuit components within the encoding circuit 101) are signaled from the video encoder 100 to a video decoder via the encoded video bitstream. In some embodiments of the present invention, the syntax elements SE may include control information used by the proposed NN filter enhancement design. For example, the control information carried by the syntax elements SE may be indicative of slice-level (or CTB-level) chroma control flags and/or NN filter output refinement parameters.

The in-loop filter(s) 120 may include a de-blocking filter (DF), a sample adaptive offset (SAO) filter, an adaptive loop filter (ALF), etc. As shown in FIG. 1, the in-loop filter(s) 120 may further include an NN filter 134. For example, the NN filter may be coupled between the SAO filter and the ALF. For another example, the NN filter may be coupled between the DF and the SAO filter. However, these are for illustrative purposes only, and are not meant to be a limitation of the present invention. As shown in FIG. 1, one or more NN filters 134 can be used by the video encoder 100, depending upon actual design considerations.

In one embodiment of the present invention, an NN filter can be applied on ALF output picture and generate the final decoded picture. In another embodiment, an NN filter can be directly applied after SAO, DF, or reconstruction, with or without other restoration methods in one video coding system. In yet another embodiment, an NN filter can be used to restore the quantization error directly or only improve the predictor quality. In the former, the NN filter is applied after processing inverse quantization and transform to restore the reconstructed residual. In the latter, the NN filter is applied on the predictors generated by inter or intra prediction. Furthermore, when NN filter(s) are applied on video coding, different color components (Y, U, V) or (Y, Cb, Cr) can be processed jointly or be processed independently.

It should be noted that the encoder architecture shown in FIG. 1 is for illustrative purposes only, and is not meant to be a limitation of the present invention. In practice, any video encoder using/supporting the proposed NN filter enhancement design falls within the scope of the present invention. As the present invention is focused on the proposed NN filter enhancement design and a person skilled in the art should readily understand details of other circuit components included in the video encoder 100, further description of principles of other circuit components included in the video encoder 100 is omitted here for brevity.

Figure 2:
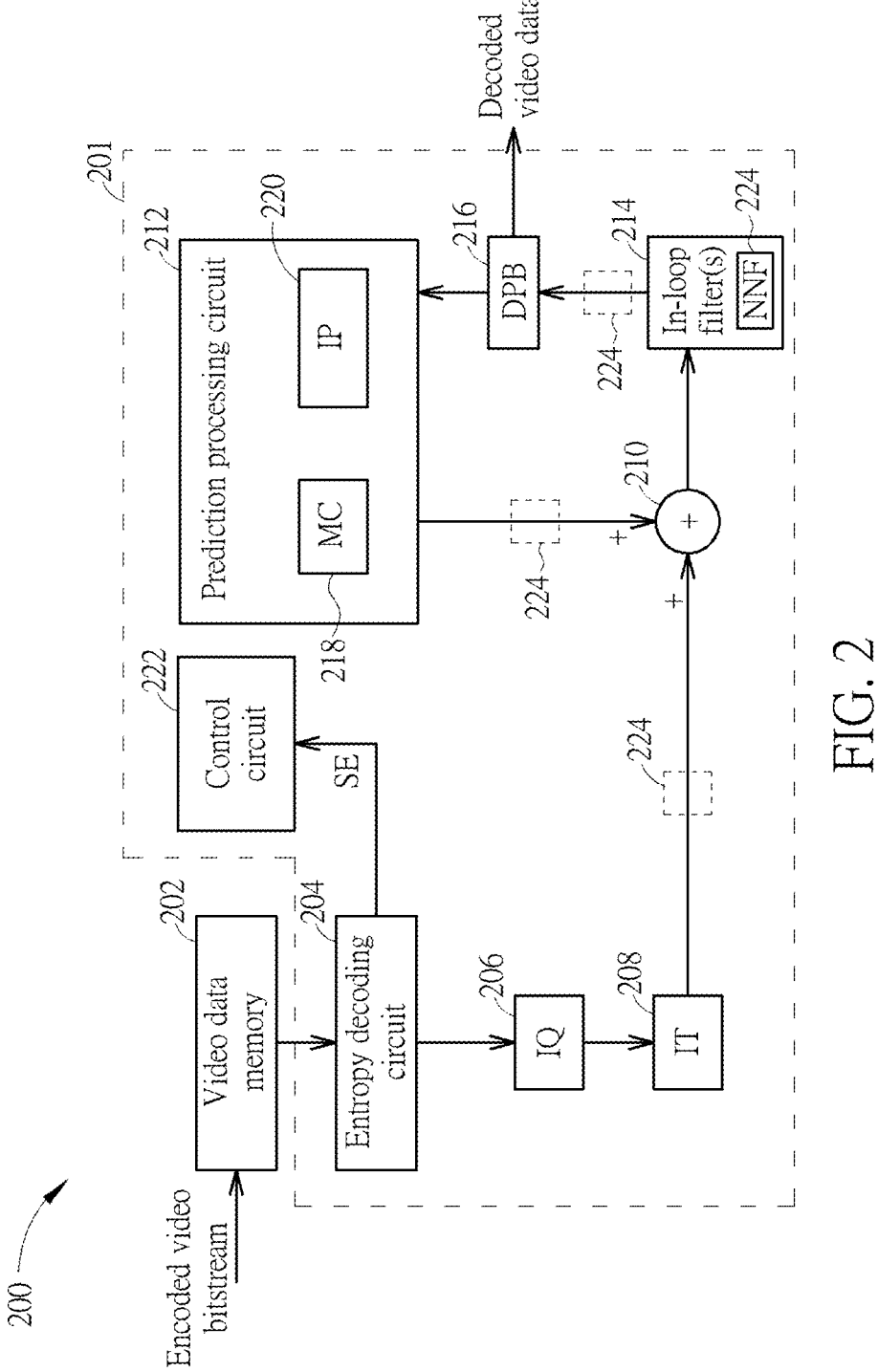
FIG. 2 is a block diagram illustrating a video decoder that supports the proposed NN filter enhancement design according to an embodiment of the present invention.

The proposed NN filter enhancement design may also be implemented in a video decoder. FIG. 2 is a block diagram illustrating a video decoder that supports the proposed NN filter enhancement design according to an embodiment of the present invention. By way of example, but not limitation, the video decoder 200 may be a VVC decoder. The video decoder 200 includes a decoding circuit 201 and a video data memory 202. The video data memory 202 is configured to receive an encoded video bitstream generated from a video encoder (e.g., video encoder 100), where the encoded video bitstream includes data to be decoded. For example, the encoded video bitstream includes data to be decoded as different blocks of pixels in the same picture, and each block may include a luma block and at least one chroma block (e.g., two chroma blocks). In some embodiments of the present invention, each block may be a CTU including one luma CTB and two chroma CTBs. The decoding circuit 201 is configured to perform decoding of the encoded video bitstream buffered in the video data memory 202. The decoding circuit 201 may include an entropy decoding circuit (e.g., a VLC decoder) 204, an inverse quantization circuit (labeled by "IQ") 206, an inverse transform circuit (labeled by "IT") 208, a reconstruction circuit 210, a prediction processing circuit 212, one or more in-loop filters 214, a decoded picture buffer (DPB) 216, a control circuit 222, and one or more NN filters (labeled by 'NNF") 224. The prediction processing circuit 212 may include a motion compensation circuit (labeled by "MC") 218 and an intra prediction circuit (labeled by "IP") 220. It should be noted that the prediction processing circuit 212 may support additional coding tools, depending upon actual design considerations.

The control circuit 222 is configured to manage a decoding procedure of each block in a picture. The control circuit 222 may receive syntax elements SE (which may carry control information of circuit components within the decoding circuit 201) parsed from the encoded video bitstream. That is, the syntax elements SE (which may carry control information of circuit components within the decoding circuit 201) are signaled via the encoded video bitstream generated from a video encoder (e.g., video encoder 100). In some embodiments of the present invention, the syntax elements SE may include control information used by the proposed NN filter enhancement design. For example, the control information carried by the syntax elements SE may be indicative of slice-level (or CTB-level) chroma control flags and/or NN filter output refinement parameters.

The in-loop filter(s) 214 may include a DF, an SAO filter, an ALF, etc. As shown in FIG. 2, the in-loop filter(s) 214 may include an NN filter 224. For example, the NN filter is coupled between the SAO filter and the ALF. For another example, the NN filter is coupled between the DF and the SAO filter. However, these are for illustrative purposes only, and are not meant to be a limitation of the present invention. As shown in FIG. 2, one or more NN filters 224 can be used by the video decoder 200, depending upon actual design considerations.

It should be noted that the decoder architecture shown in FIG. 2 is for illustrative purposes only, and is not meant to be a limitation of the present invention. In practice, any video decoder using/supporting the proposed NN filter enhancement design falls within the scope of the present invention. As the present invention is focused on the proposed NN filter enhancement design and a person skilled in the art should readily understand details of other circuit components included in the video decoder 200, further description of principles of other circuit components included in the video decoder 200 is omitted here for brevity.

Different NN filter modes can be selected for each color component (Y/U/V) in the slice-level (or CTB-level) when the NN filter is applied on video coding. Specifically, after a region is processed by an NN filter at a video encoder, a filter output of the NN filter is analyzed by the video encoder (e.g., control circuit 132 of video encoder 100) to determine a best NN filter mode for the region, and the selected NN filter mode for the region is signaled to a video decoder via an encoded video bitstream generated from the video encoder. For example, an "Off" mode can be selected when the overall performance (e.g., rate-distortion performance) of the region with NN filtering gets worse than that of the region without NN filtering. Hence, a filter output of the NN filter applied to each block in the region is not involved in coding of the block when the slice-level "Off" mode is selected. For another example, an "All On" mode can be selected when the overall performance (e.g., rate-distortion performance) of the region with NN filtering gets better than that of the region without NN filtering. Hence, a filter output of the NN filter applied to each block in the region is involved in coding of the block when the slice-level "All On" mode is selected. For yet another example, a "Block on/off" mode can be selected when the performance (e.g., rate-distortion performance) of some blocks with NN filtering in the region gets better than that of these blocks without NN filtering in the region and the performance (e.g., rate-distortion performance) of other blocks with NN filtering in the region gets worse than that of these blocks without NN filtering in the region. Hence, a filter output of the NN filter applied to one block (which has an "Off mode") in the region is not involved in coding of the block when the slice-level "Block on/off" mode is selected, and a filter output of the NN filter applied to another block (which does not have an "Off" mode) in the same region is involved in coding of the block when the slice-level "Block on/off" mode is selected. To put it simply, a filter output of the NN filter applied to a luma/chroma block is fed into a next stage of a video encoding/decoding procedure when the luma/chroma block does not have an "Off" mode.

Figure 3:
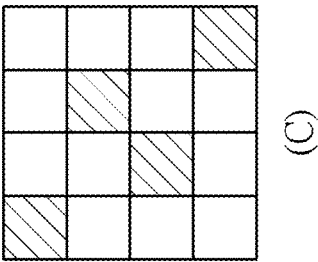
FIG. 3 is a diagram illustrating a concept of overriding a slice-level NN filter mode by the proposed slice-level chroma control flag according to an embodiment of the present invention.
Figure 3:
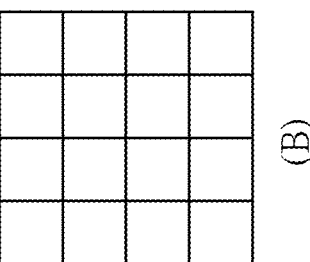
Figure 3:
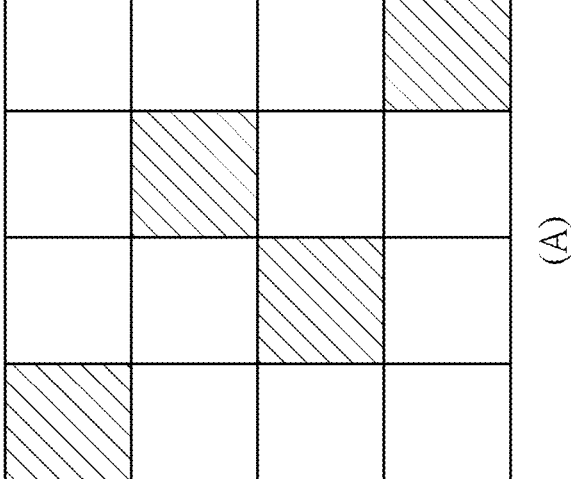

To reduce more rates and obtain better performance, the present invention proposes a chroma control flag (e.g., slice-level chroma control flag or CTB-level chroma control flag) for each chroma component U/V. Each chroma component has its own chroma control flag which forces its CTBs to be "Off" modes when NN filter modes of the corresponding luma CTBs are "Off" modes. With the help of the proposed slice-level chroma control flag, signaling overhead can be reduced due to the fact that a single bit is capable of setting NN filter modes of multiple chroma blocks. It should be noted that the proposed slice-level/CTB-level chroma control flag has higher priority than the slice-level NN filter mode, and only works on the "Off" mode of luma CTBs. Hence, NN filter modes of chroma CTBs are not modified when the slice-level NN filter modes of corresponding luma CTBs are "All on" modes. FIG. 3 is a diagram illustrating a concept of overriding a slice-level NN filter mode by the proposed slice-level chroma control flag according to an embodiment of the present invention. The sub-diagram (A) illustrates an example of a luma component with a slice-level "Block on/off" mode, where NN filter modes of some CTBs (labeled by slashed regions) are "Off" modes, and NN filter modes of some CTBs (labeled by blank regions) are not "Off" modes. The sub-diagram (B) illustrates an example of a chroma component with a slice-level "All on" mode when the proposed slice-level chroma control flag is turned off (e.g., chroma_control_flag=0). The co-located luma CTB and chroma CTB belong to the same CTU. Since the proposed slice-level chroma control flag is turned off (e.g., chroma_control_flag=0), the slice-level "All on" mode is not overridden by the proposed slice-level chroma control flag. Hence, although NN filter modes of some luma CTBs are "Off" modes, NN filter modes of corresponding chroma CTBs are not forced to align with "Off" modes of the luma CTBs. The sub-diagram (C) illustrates an example of a chroma component with a slice-level "All on" mode when the proposed slice-level chroma control flag is turned on (e.g., chroma_control_flag=1). Since the proposed slice-level chroma control flag is turned on (e.g., chroma_control_flag=1), the slice-level "All on" mode is overridden by the proposed slice-level chroma control flag. Hence, NN filter modes of some chroma CTBs are forced to align with "Off" modes of the corresponding luma CTBs, as indicated by the slashed regions.

It should be noted that each chroma component may have its own chroma control flag. Hence, after slice-level NN filter modes of the U component are obtained, the NN filter modes of U CTBs are forced to be "Off" mode when NN filter modes of their corresponding Y CTBs are "Off" mode, if the slice-level/CTB-level chroma control flag of the U component is turned on (e.g., chroma_control_flag_U=1). Similarly, after slice-level NN filter modes of the V component are obtained, the NN filter modes of V CTBs are forced to be "Off" mode when NN filter modes of their corresponding Y CTBs are "Off" mode, if the slice-level/CTB-level chroma control flag of the V component is turned on (e.g., chroma_control_flag_V=1).

Figure 4:
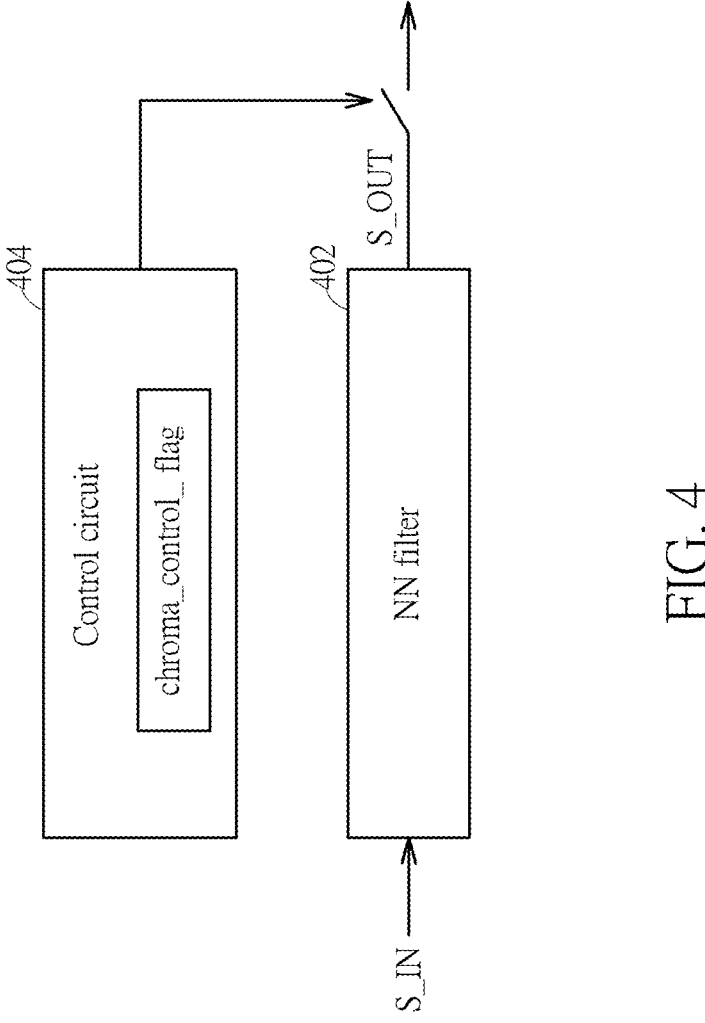
FIG. 4 is a diagram illustrating a first NN filter enhancement design according to an embodiment of the present invention.

As mentioned above, the proposed NN filter enhancement design can be implemented in both of the video encoder 100 and the video decoder 200. FIG. 4 is a diagram illustrating a first NN filter enhancement design according to an embodiment of the present invention. Consider a decoding case where one of the NN filters 224 in FIG. 2 may be implemented by the NN filter 402, and the control circuit 222 in FIG. 2 may be implemented by the control circuit 404. The filter input S_IN is generated during a decoding procedure of a chroma block (e.g., U/V CTB) of a current block (e.g., CTU) to be decoded. The decoder-side control circuit 404 is configured to determine whether to apply the NN filter 402 on a luma block (e.g., luma CTB) and at least one corresponding chroma block (e.g., two chroma CTBs) according to an NN filter mode of the luma block and at least one NN filter mode of the at least one chroma. In some embodiments, the decoder-side control circuit 404 is further configured to check at least one chroma control flag chroma_control_flag (e.g., chroma_control_flag_U and/or chroma_control_flag_V) for at least one chroma component
(e.g., U and/or V), where the at least one chroma control flag
chroma_control_flag is associated with control of the at least
one NN filter mode of the at least one chroma block. For
example, the decoder-side control circuit 404 is further
configured to refer to the at least one chroma control flag
chroma_control_flag to force the at least one NN filter mode
of the at least one chroma block to be an "Off" mode when
an NN filter mode of the corresponding luma block is the
"Off" mode, where the luma block (e.g., luma CTB) and the
at least one chroma block (e.g., two chroma CTBs) belong
to a same block (e.g., CTU), and a filter output S_OUT of
the decoder-side NN filter 402 is not involved in decoding
of the luma block and the at least one chroma block under
the "Off" mode.

In some embodiments, the at least one chroma control flag
chroma_control_flag (e.g., chroma_control_flag_U and/or
chroma_control_flag_V) may be a user-defined flag that is
not indicated by a signaled syntax element. For example, the
at least one chroma control flag chroma_control_flag can be
declared in configuration or macro definition. No additional
bit should be signaled via the encoded video bitstream. It
means that only the slice-level NN filter modes of three color
components (Y, U, V) should be signaled via the encoded
video bitstream, and chroma control flags of two chroma
components (U, V) are not required to be signaled via the
encoded video bitstream.

In some embodiments of the present invention, the
entropy decoding circuit 204 parses the at least one chroma
control flag chroma_control_flag (e.g., chroma_
control_flag_U and/or chroma_control_flag_V) from the
encoded video bitstream, and informs the decoder-side con-
trol circuit 404 of the at least one chroma control flag
chroma_control_flag (e.g., chroma_control_flag_U and/or
chroma_control_flag_V). Hence, not only the slice-level NN
filter modes of three color components (Y, U, V) but also
chroma control flags of two chroma components (U, V)
should be signaled via the encoded video bitstream, where
the proposed chroma control flags have higher priority than
the slice-level NN filter modes.

Consider an encoding case where one of the NN filters
134 in FIG. 1 may be implemented by the NN filter 402, and
the control circuit 132 in FIG. 1 may be implemented by the
control circuit 404. The encoder-side control circuit 404 is
configured to select an NN filter mode of a luma block (e.g.,
luma CTB) and at least one NN filter mode of at least one
corresponding chroma block (e.g., two chroma CTBs), to
indicate whether the NN filter 402 is applied on the luma
block and the at least one chroma block. In some embodi-
ments of the present invention, the encoder-side control
circuit 404 is configured to generate at least one chroma
control flag chroma_control_flag (e.g., chroma_
control_flag_U and/or chroma_control_flag_V) for at least
one chroma component (e.g., U and/or V), where the at least
one chroma control flag is associated with control of the at
least one NN filter mode of the at least one chroma block.
For example, the at least one chroma control flag
chroma_control_flag (e.g., chroma_control_flag_U and/or
chroma_control_flag_V) is configured to indicate to force an
NN filter mode of the at least one chroma block to be an NN
filter mode of the corresponding luma block that is set by an
"Off" mode, where the luma block (e.g., luma CTB) and the
at least one chroma block (e.g., two chroma CTBs) belong
to a same block (e.g., CTU), and the filter output S_OUT of
the NN filter 402 is not involved in encoding of the luma
block and the at least one chroma block under the "Off"
mode that is determined by the video encoder 100. In addition, the encoder-side control circuit 404 is configured
to signal the at least one chroma control flag chroma_con-
trol_flag (e.g., chroma_control_flag_U and/or chroma_con-
trol_flag_V) via the encoded video bitstream. That is, the
encoder-side control circuit 404 provides the at least one
chroma control flag chroma_control_flag (e.g., chroma_con-
trol_flag_U and/or chroma_control_flag_V) to the entropy
encoding circuit 112, such that the at least one chroma
control flag chroma_control_flag (e.g., chroma_
control_flag_U and/or chroma_control_flag_V) is signaled
from the video encoder 100 to a video decoder (e.g., video
decoder 200) via the encoded video bitstream. Hence, not
only the slice-level NN filter modes of three color compo-
nents (YUV) but also chroma control flags of two chroma
components (UV) should be signaled via the encoded video
bitstream, where the proposed chroma control flags have
higher priority than the slice-level NN filter modes.

In some embodiments, a decoder-side control circuit may
use a user-defined flag (which may be declared in configu-
ration or macro definition) as the at least one chroma control
flag chroma_control_flag (e.g., chroma_control_flag_U and/
or chroma_control_flag_V) without parsing syntax elements
signaled via the encoded video bitstream. Hence, the
encoder-side control circuit 404 may be modified to employ
the same user-defined flag and skip the operation of signal-
ing the at least one chroma control flag chroma_control_flag
(e.g., chroma_control_flag_U and/or chroma_
control_flag_V) for at least one chroma component (e.g., U
and/or V). It means that only the slice-level NN filter modes
of three color components (Y, U, V) should be signaled via
the encoded video bitstream, and chroma control flags of
two chroma components (U, V) are not required to be
signaled via the encoded video bitstream.

Figure 5:
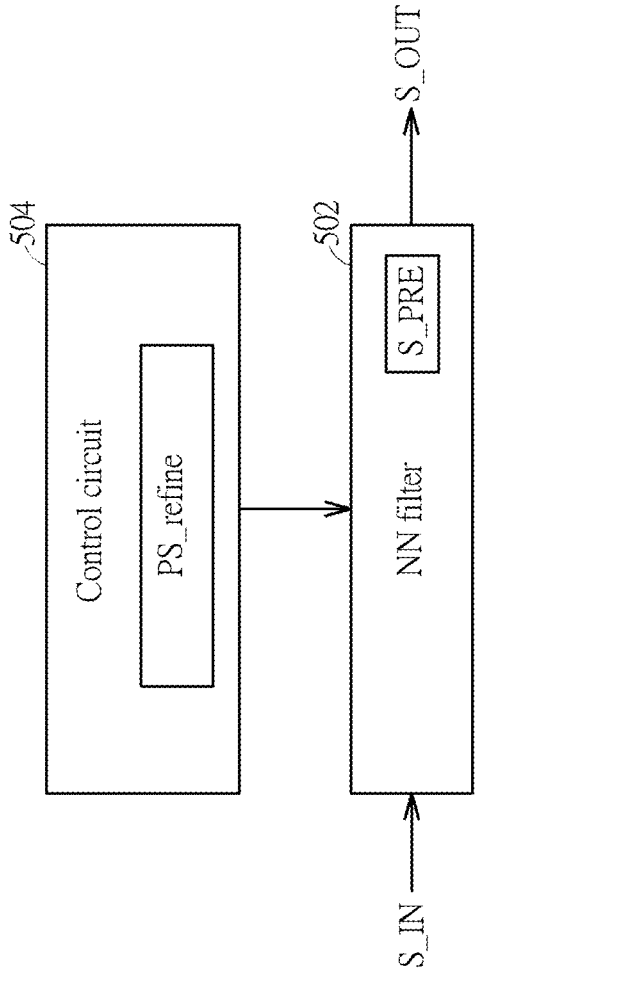
FIG. 5 is a diagram illustrating a second NN filter enhancement design according to an embodiment of the present invention.

FIG. 5 is a diagram illustrating a second NN filter
enhancement design according to an embodiment of the
present invention. Consider a decoding case where one of
the NN filters 224 in FIG. 2 may be implemented by the NN
filter 502, and the control circuit 222 in FIG. 2 may be
implemented by the control circuit 504. The filter input S_IN
is generated during a decoding procedure of a current block
(which may be a CTU including one luma CTB and two
chroma CTBs). In other words, the filter input S_IN may be
generated during a decoding procedure of a luma CTB, or
may be generated during a decoding procedure of a chroma
CTB. The NN filter 502 is configured to process the filter
input S_IN to generate a filter output S_PRE, and then apply
refinement on the filter output S_PRE to generate a refined
filter output as a final filter output S_OUT.

The behavior of the refinement is defined by a parameter
set PS_refine provided or selected by the decoder-side
control circuit 504. The parameter set PS_refine may include
one or more parameters, depending upon actual design
considerations. For example, the parameter set PS_refine
may include a scale parameter and an offset parameter that
represent a multiplication operation and an addition opera-
tion, respectively. In some embodiments of the present
invention, the filter output S_PRE is scaled, and then is
added by an offset. The refinement may be expressed using
the following formula.

$$S\_OUT = scale \times S\_PRE + offset \quad (1)$$

In some embodiments of the present invention, some rules
may be considered to do the refinement. That is, the refine-
ment performed on the NN filter output may be rule-dependent. The decoder-side control circuit 504 checks if the filter output S_PRE (i.e., a filter output before refinement) satisfies a predefined rule. When the filter output S_PRE satisfies the predefined rule, the decoder-side control circuit 504 determines/selects the parameter set PS_refine, and configures the refinement by the parameter set PS_refine. Hence, the refinement configured by the parameter set PS_refine (which depends on the predefined rule) is applied to the filter output S_PRE (i.e., a filter output before refinement) to generate a final filter output S_OUT (i.e., a filter output after refinement). For example, the rule-dependent refinement may be expressed using the following formulas.

if(S_PRE < 0): (2)

$$S\_OUT = \min(\text{scale} \times S\_PRE + \text{offset}, 0)$$

else if(S_PRE > 0): (3)

$$S\_OUT = \max(\text{scale} \times S\_PRE - \text{offset}, 0)$$

In some embodiments of the present invention, the decoder-side control circuit 504 may have an ordered list of a plurality of parameter set candidates, and select the parameter set PS_refine from the parameter set candidates. For example, the entropy decoding circuit 204 parses a parameter set index from the encoded video bitstream, and informs the decoder-side control circuit 504 of the parameter set index, where the parameter set index indicates the selection of the parameter set PS_refine. If the list has only a single parameter set candidate, no signaling of the parameter set index is needed. That is, the single parameter set candidate is directly selected as the parameter set PS_refine by the decoder-side control circuit 504, and each of the parameters (e.g., a scale parameter and an offset parameter) of the parameter set PS_refine is a default parameter that is not indicated by a signaled syntax element.

In some embodiments of the present invention, selections of parameters of the parameter set PS_refine may be signaled separately. Suppose that parameters of the parameter set PS_refine include a scale parameter and an offset parameter. The decoder-side control circuit 504 may have an ordered list of a plurality of scale parameter candidates and an ordered list of a plurality of offset parameter candidates. The entropy decoding circuit 204 parses a first syntax element and a second syntax element from the encoded video bitstream, and informs the decoder-side control circuit 504 of the first syntax element and the second syntax element, where the first syntax element indicates the selection of the scale parameter, and the second syntax element indicates the selection of the offset parameter.

In some embodiments of the present invention, selections of only a portion of the parameters of the parameter set PS_refine may be signaled, and the rest of the parameters of the parameter set PS_refine may be default parameters, each of which is not indicated by a signaled syntax element. That is, the parameters of the parameter set PS_refine may include default parameter(s) and non-default parameter(s). Suppose that parameters of the parameter set PS_refine include a scale parameter and an offset parameter. In a case where the scale parameter is a non-default parameter and the offset parameter is a default parameter, the entropy decoding circuit 204 parses the scale parameter from the encoded video bitstream, and informs the decoder-side control circuit 504 of the scale parameter. In another case where the scale parameter is a default parameter and the offset parameter is a non-default parameter, the entropy decoding circuit 204 parses the offset parameter from the encoded video bitstream, and informs the decoder-side control circuit 504 of the offset parameter. For example, a non-zero offset parameter is allowed and its syntax element is signaled only when the scale parameter is equal to a default value (e.g., 0). For other values of the scale parameter, the offset parameter should be set by a default value (e.g., 0).

Consider an encoding case where one of the NN filters 134 in FIG. 1 may be implemented by the NN filter 502, and the control circuit 132 in FIG. 1 may be implemented by the control circuit 504. The filter input S_IN is generated during an encoding procedure of a current block (which may be a CTU including one luma CTB and two chroma CTBs). For example, the filter input S_IN may be generated during an encoding procedure of a luma CTB, or may be generated during an encoding procedure of a chroma CTB. The NN filter 502 is configured to process the filter input S_IN to generate a filter output S_PRE, and then apply refinement on the filter output S_PRE to generate a refined filter output as a final filter output S_OUT.

The behavior of the refinement is defined by a parameter set PS_refine provided/selected by the encoder-side control circuit 504. The parameter set PS_refine may include one or more parameters, depending upon actual design considerations. For example, the parameter set PS_refine may include a scale parameter and an offset parameter that represent a multiplication operation and an addition operation, respectively. The refinement applied to the filter output S_PRE may employ one of the aforementioned formulas (1), (2), and (3).

In some embodiments of the present invention, the encoder-side control circuit 504 may have an ordered list of a plurality of parameter set candidates (which is the same as that possessed by a decoder-side control circuit), select the parameter set PS_refine from the parameter set candidates, and provide a syntax element (e.g., a parameter set index) indicative of the selection of the parameter set PS_refine to the entropy encoding circuit 112. Hence, the parameter set index is signaled from the video encoder 100 to a video decoder (e.g., video decoder 200) via the encoded video bitstream. If the list has only a single parameter set candidate, no signaling of the parameter set index is needed. That is, the single parameter set candidate is directly selected as the parameter set PS_refine by the encoder-side control circuit 504, and each of the parameters (e.g., a scale parameter and an offset parameter) of the parameter set PS_refine is a default parameter.

In some embodiments of the present invention, selections of parameters of the parameter set PS_refine may be signaled separately. Suppose that parameters of the parameter set PS_refine include a scale parameter and an offset parameter. The encoder-side control circuit 504 may have an ordered list of a plurality of scale parameter candidates (which is the same as that possessed by a decoder-side control circuit) and an ordered list of a plurality of offset parameter candidates (which is the same as that possessed by the decoder-side control circuit). The encoder-side control circuit 504 provides a first syntax element (e.g., a scale parameter index) indicative of selection of the scale parameter and a second syntax element (e.g., an offset parameter index) indicative of selection of the offset parameter to the entropy encoding circuit 112. Hence, the first syntax element and the second syntax element are signaled from the video encoder 100 to a video decoder (e.g., video decoder 200) via the encoded video bitstream.

In some embodiments of the present invention, selections of only a portion of the parameters of the parameter set PS_refine may be signaled, and the rest of the parameters of the parameter set PS_refine may be default parameters. That is, the parameters of the parameter set PS_refine may include default parameter(s) and non-default parameter(s). Suppose that parameters of the parameter set PS_refine include a scale parameter and an offset parameter. In a case where the scale parameter is a non-default parameter and the offset parameter is a default parameter, the encoder-side control circuit 504 provides a syntax element indicative of the scale parameter to the entropy encoding circuit 112. Hence, the scale parameter is signaled from the video encoder 100 to a video decoder (e.g., video decoder 200) via the encoded video bitstream. In another case where the scale parameter is a default parameter and the offset parameter is a non-default parameter, the encoder-side control circuit 504 provides a syntax element indicative of the offset parameter to the entropy encoding circuit 112. Hence, the offset parameter is signaled from the video encoder 100 to a video decoder (e.g., video decoder 200) via the encoded video bitstream. For example, a non-zero offset parameter is allowed and its syntax element is signaled only when the scale parameter is equal to a default value (e.g., 0). For other values of the scale parameter, the offset parameter should be set by a default value (e.g., 0).

Figure 6:
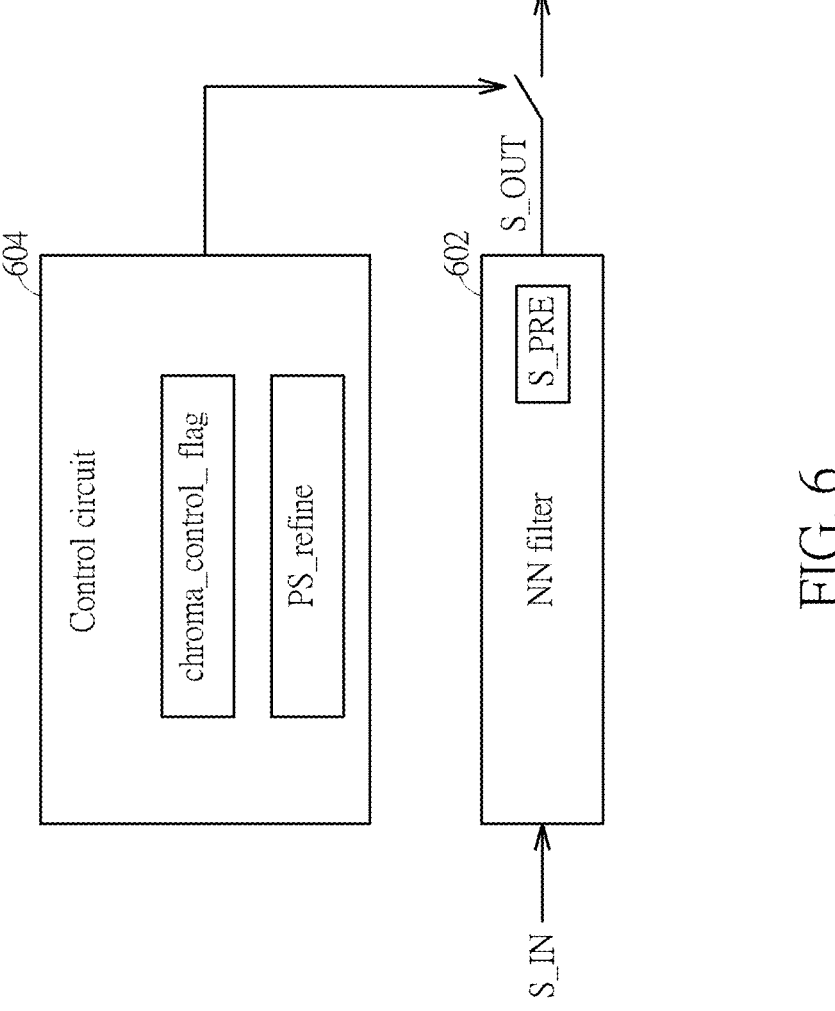
FIG. 6 is a diagram illustrating a third NN filter enhancement design according to an embodiment of the present invention.

FIG. 6 is a diagram illustrating a third NN filter enhancement design according to an embodiment of the present invention. In accordance with the third NN filter enhancement, the aforementioned function of applying slice-level/ CTB-level chroma control flags for two chroma components and the aforementioned function of refining an NN filter output for any color component are both adopted. A current picture may be partitioned into a plurality of blocks (e.g., CTUs), including a first block (which may be a CTU including one luma CTB and two chroma CTBs) and a second block (which may be another CTU including one luma CTB and two chroma CTBs). Consider a decoding case where one of the NN filters 224 in FIG. 2 may be implemented by the NN filter 602, and the control circuit 222 in FIG. 2 may be implemented by the control circuit 604. Regarding decoding of the first block, the decoder-side control circuit 604 is configured to check at least one control flag chroma_control_flag (e.g., chroma_ control_flag_U and/or chroma_control_flag_V) for at least one chroma component (e.g., U and/or V), and refer to the at chroma control flag chroma_control_flag least one (chroma_control_flag=1) to force an NN filter mode of the at least one chroma block of the first block to be an "Off" mode when an NN filter mode of the corresponding luma block of the first block is the "Off" mode, where the filter output S_OUT of the NN filter 602 is not involved in decoding of the luma block and the at least one chroma block under the "Off" mode.

Regarding decoding of the second block, the decoder-side control circuit 604 provides the parameter set PS_refine (which may include a scale parameter and an offset parameter) to the NN filter 602 for configuring the refinement to be applied to the NN filter output, and the NN filter 602 applies the refinement on the filter output S_PRE to generate a refined filter output as the final filter output S_OUT, where the filter input S_IN is generated during a decoding procedure of the luma block of the second block, or generated during a decoding procedure of the chroma block of the second block. If an NN filter mode of a luma block is not the "Off" mode, the final filter output S_OUT (i.e., filter output after refinement) generated for the luma block is involved in decoding of the luma block. If an NN filter mode of at least one chroma block is not the "Off" mode, the final filter output S_OUT (i.e., filter output after refinement) generated for the at least one chroma block is involved in decoding of the at least one chroma block.

Consider an encoding case where one of the NN filters 134 in FIG. 1 may be implemented by the NN filter 602, and the control circuit 132 in FIG. 1 may be implemented by the control circuit 604. Regarding encoding of the first block, the encoder-side control circuit 604 is configured to generate at least one chroma control flag chroma_control_flag (e.g., chroma_control_flag_U and/or chroma_control_flag_V) for at least one chroma component (e.g., U and/or V), where the at least one chroma control flag chroma_control_flag (e.g., chroma_control_flag_U and/or chroma_control_flag_V) is configured to indicate to force an NN filter mode of the at least one chroma block of the first block to be an NN filter mode of the corresponding luma block of the first block that is set by an "Off" mode, where the filter output S_OUT of the NN filter 602 is not involved in encoding of the luma block and the at least one chroma block under the "Off" mode.

Regarding encoding of the second block, the encoder-side control circuit 604 provides the parameter set PS_refine (which may include a scale parameter and an offset parameter) to the NN filter 602, and the NN filter 602 applies refinement configured by the parameter set PS_refine on the filter output S_PRE to generate a refined filter output as the final filter output S_OUT, where the filter input S_IN is generated during a decoding procedure of the luma block of the second block, or generated during a decoding procedure of the chroma block of the second block. If an NN filter mode of a luma block is not the "Off" mode, the final filter output S_OUT (i.e., filter output after refinement) generated for the luma block is involved in decoding of the luma block. If an NN filter mode of at least one chroma block is not the "Off" mode, the final filter output S_OUT (i.e., filter output after refinement) generated for the at least one chroma block is involved in decoding of the at least one chroma block.

As a person skilled in the art can readily understand details of the NN filter 602 and the control circuit 604 after reading above paragraphs directed to the embodiments shown in FIG. 4 and FIG. 5, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video decoding method comprising:
  receiving an encoded video bitstream, wherein the encoded video bitstream comprises data to be decoded as a first block of pixels in a picture, and the first block comprises a luma block and at least one chroma block; and
  decoding the first block, comprising:
    determining whether to apply a neural network (NN) filter on the luma block and the at least one chroma block according to an NN filter mode of the luma block and at least one NN filter mode of the at least one chroma block, comprising:
      checking at least one chroma control flag for at least one chroma component, wherein the at least one chroma control flag indicates whether the at least one NN filter mode of the at least one chroma block is forced to align with the NN filter mode of the luma block.

2. The video decoding method of claim 1, wherein each of the at least one chroma control flag is a slice-level or coding tree block (CTB)-level chroma control flag.

3. The video decoding method of claim 1, wherein determining whether to apply the NN filter on the luma block and the at least one chroma block according to the NN filter mode of the luma block and the at least one NN filter mode of the at least one chroma block further comprises:
according to the at least one chroma control flag, forcing the at least one NN filter mode of the at least one chroma block to be an off mode in response to the NN filter mode of the luma block being the off mode, wherein an output of the NN filter is not involved in decoding of the luma block and the at least one chroma block under the off mode.

4. The video decoding method of claim 1, wherein the luma block is a luma coding tree block (CTB), and each of the at least one chroma block is a chroma CTB.

5. The video decoding method of claim 1, wherein the at least one chroma control flag is a user-defined flag that is not indicated by a signaled syntax element.

6. The video decoding method of claim 1, wherein decoding the first block further comprises:
parsing the at least one chroma control flag from the encoded video bitstream.

7. The video decoding method of claim 1, wherein decoding the first block further comprises:
parsing an NN filter mode of each of the at least one chroma component from the encoded video bitstream;
wherein the at least one chroma control flag has higher priority than the NN filter mode parsed from the encoded video bitstream.

8. A video decoding method comprising:
receiving an encoded video bitstream, wherein the encoded video bitstream comprises data to be decoded as a first block of pixels in a picture, and the first block comprises a luma block and at least one chroma block; and
decoding the first block, comprising:
determining whether to apply a neural network (NN) filter on the luma block and the at least one chroma block according to an NN filter mode of the luma block and at least one NN filter mode of the at least one chroma block;
wherein the encoded video bitstream further comprises data to be decoded as a second block of pixels in the picture, and the video decoding method further comprises:
decoding the second block, comprising:
applying the NN filter on a filter input to generate a filter output, wherein the filter input is generated during a decoding procedure of the second block; and
applying refinement on the filter output to generate a refined filter output as a final filter output of the NN filter.

9. The video decoding method of claim 8, wherein the refinement comprises a scale parameter and an offset parameter.

10. The video decoding method of claim 8, wherein applying the refinement on the filter output comprises:
checking if the filter output satisfies a predefined rule; and
in response to the filter output satisfying the predefined rule, applying the refinement on the filter output.

11. The video decoding method of claim 8, wherein the refinement comprises at least one default parameter that is not indicated by a signaled syntax element.

12. The video decoding method of claim 11, wherein the refinement further comprises at least one non-default parameter, and decoding the second block further comprises:
parsing the at least one non-default parameter from the encoded video bitstream.

13. The video decoding method of claim 7, wherein the refinement comprises a parameter set, and decoding the second block further comprises:
parsing a parameter set index from the encoded video bitstream, wherein the parameter set index indicates selection of the parameter set from a plurality of parameter set candidates.

14. The video decoding method of claim 8, wherein the refinement comprises a parameter set having at least a first parameter and a second parameter, and decoding the second block further comprises:
parsing a first syntax element from the encoded video bitstream, wherein the first syntax element indicates selection of the first parameter; and
parsing a second syntax element from the encoded video bitstream, wherein the second syntax element indicates selection of the second parameter.

15. A video encoding method comprising:
receiving video data, wherein the video data comprises data to be encoded as a first block of pixels in a picture, and the first block comprises a luma block and at least one chroma block; and
encoding the first block, comprising:
selecting a neural network (NN) filter mode of the luma block and at least one NN filter mode of the at least one chroma block, to indicate whether an NN filter is applied on the luma block and the at least one chroma block; and
generating at least one chroma control flag for at least one chroma component, wherein the at least one chroma control flag indicates whether the at least one NN filter mode of the at least one chroma block is forced to align with the NN filter mode of the luma block.

16. The video encoding method of claim 15, wherein encoding the first block further comprises:
signaling the at least one chroma control flag via an encoded video bitstream.

17. The video encoding method of claim 15, wherein the at least one chroma control flag is configured to indicate to force the at least one NN filter mode of the at least one chroma block to be the NN filter mode of the luma block that is set by an off mode, wherein an output of the NN filter is not involved in encoding of the luma block and the at least one chroma block under the off mode.

18. The video encoding method of claim 15, wherein the video bitstream further comprises data to be encoded as a second block of pixels in the picture, and the video encoding method further comprises:
encoding the second block, comprising:
applying the NN filter on a filter input to generate a filter output, wherein the filter input is generated during an encoding procedure of the second block; and
applying refinement on the filter output to generate a refined filter output as a final filter output of the NN filter.

19. A video decoder comprising:

a video data memory, configured to receive an encoded video stream, wherein the encoded video bitstream comprises data to be decoded as a block of pixels in a picture, wherein the block comprises a luma block and at least one chroma block; and a decoding circuit, configured to perform decoding of the block, wherein the decoding circuit comprises:

a neural network (NN) filter; and a control circuit, configured to determine whether to apply the NN filter on the luma block and the at least one chroma block according to an NN filter mode of the luma block and at least one NN filter mode of the at least one chroma block, comprising:

checking at least one chroma control flag for at least one chroma component, wherein the at least one chroma control flag indicates whether the at least one NN filter mode of the at least one chroma block is forced to align with the NN filter mode of the luma block.

\* \* \* \* \*